United States Patent [19]

Kawaguchi

[11] Patent Number: 4,860,427
[45] Date of Patent: Aug. 29, 1989

[54] WIRE STRIPPING APPARATUS AND AN AUTOMATIC WIRING DEVICE WHICH INCORPORATES IT

[75] Inventor: Seiji Kawaguchi, Tokyo, Japan

[73] Assignee: Apollo Seiko Ltd., Tokyo, Japan

[21] Appl. No.: 181,146

[22] Filed: Apr. 13, 1988

Related U.S. Application Data

[63] Continuation of Ser. No. 25,750, Mar. 13, 1987, Pat. No. 4,738,019.

[30] Foreign Application Priority Data

Apr. 9, 1986 [JP] Japan ................................ 61-80221

[51] Int. Cl.[4] ........................................... H01R 43/00
[52] U.S. Cl. .................................... 29/564.4; 29/755; 81/9.51
[58] Field of Search ............... 29/564.4, 566.1, 564.6, 29/564.7, 564.8, 33 M, 748, 755; 81/9.51

[56] References Cited

U.S. PATENT DOCUMENTS

| | | | |
|---|---|---|---|
| 3,155,136 | 11/1964 | Laskowski | 81/9.51 X |
| 3,741,261 | 6/1973 | Windsor et al. | 29/564.4 X |
| 3,748,932 | 7/1973 | Neiman et al. | 81/9.51 |
| 3,895,426 | 7/1975 | Papsdorf | 29/564.4 X |
| 3,897,617 | 8/1975 | Ackerman et al. | 29/564.4 |
| 3,947,943 | 4/1976 | Kukubo et al. | 29/755 |
| 4,024,630 | 5/1977 | Wahren et al. | 29/564.4 |
| 4,091,695 | 5/1978 | Funcik et al. | 81/9.51 |
| 4,275,619 | 6/1981 | Shimizu | 29/566.1 |
| 4,361,942 | 12/1982 | Mazzola et al. | 29/33 M |
| 4,479,407 | 10/1984 | Mikami et al. | 29/564.4 X |
| 4,554,725 | 11/1985 | Over | 29/564.4 |
| 4,584,912 | 4/1986 | Gudmestad et al. | 81/9.51 |
| 4,593,452 | 6/1986 | Keahey et al. | 29/755 X |
| 4,630,353 | 12/1986 | Okazaki et al. | 29/564.4 |

FOREIGN PATENT DOCUMENTS 57114 8/1982 European Pat. Off. ............... 29/755

2129642 2/1979 Fed. Rep. of Germany ..... 29/564.4

Primary Examiner—William Briggs
Attorney, Agent, or Firm—Schwartz & Weinrieb

[57] ABSTRACT

Apparatus for cutting a lead wire (7) from a supply wire (4) and for removing insulation covering portions (5) from the opposite ends of the lead wire (7) includes a pair of pinch rollers (13), a pair of opposed cutters (14), and a gripping device (15). The cutters (14) include wire cutting sections adapted to be moved into butt contact with each other, and insulation covering cutting sections (20) which will only sever the insulation covering without cutting through the entire wire. In order to form the lead wire (7) and remove the insulation covering portions (5) from opposite ends of the lead wire (7), the pinch rollers (13) initially advance the supply wire (4) such that a predetermined portion of the free end of the supply wire (4) extends beyond the cutters (14) as seen in FIG. 5(A). The insulation cutting sections (20) of the cutters (14) are aligned with the supply wire (4) such that upon opposed contact of the cutters (14), insulation covering (5) is severed from a first end of the lead wire (7) and removed therefrom as a result of reverse movement of the pinch rollers (13) as seen from FIGS. 5(B) and 5(C). The pinch rollers (13) then advance the supply wire (4) a predetermined amount so as to define the lead wire (7), gripping device (15) grips the lead wire (7), and the wire cutting sections of the cutters (14) sever the supply wire (4) so as to provide the lead wire (7), as seen in FIGS. 5(D)–5(F). Gripping device (15) then advances a predetermined portion of the lead wire (7) beyond the cutters (14), the insulation covering cutting sections (20) of the cutters cut the insulation covering at the second end of the lead wire (7), and the gripping device (15) is moved in the opposite direction so as to cooperate with cutters (14) in order to remove the insulation covering portion (5) from the other end of the lead wire as seen in FIGS. 5(F)–5(H).

20 Claims, 8 Drawing Sheets

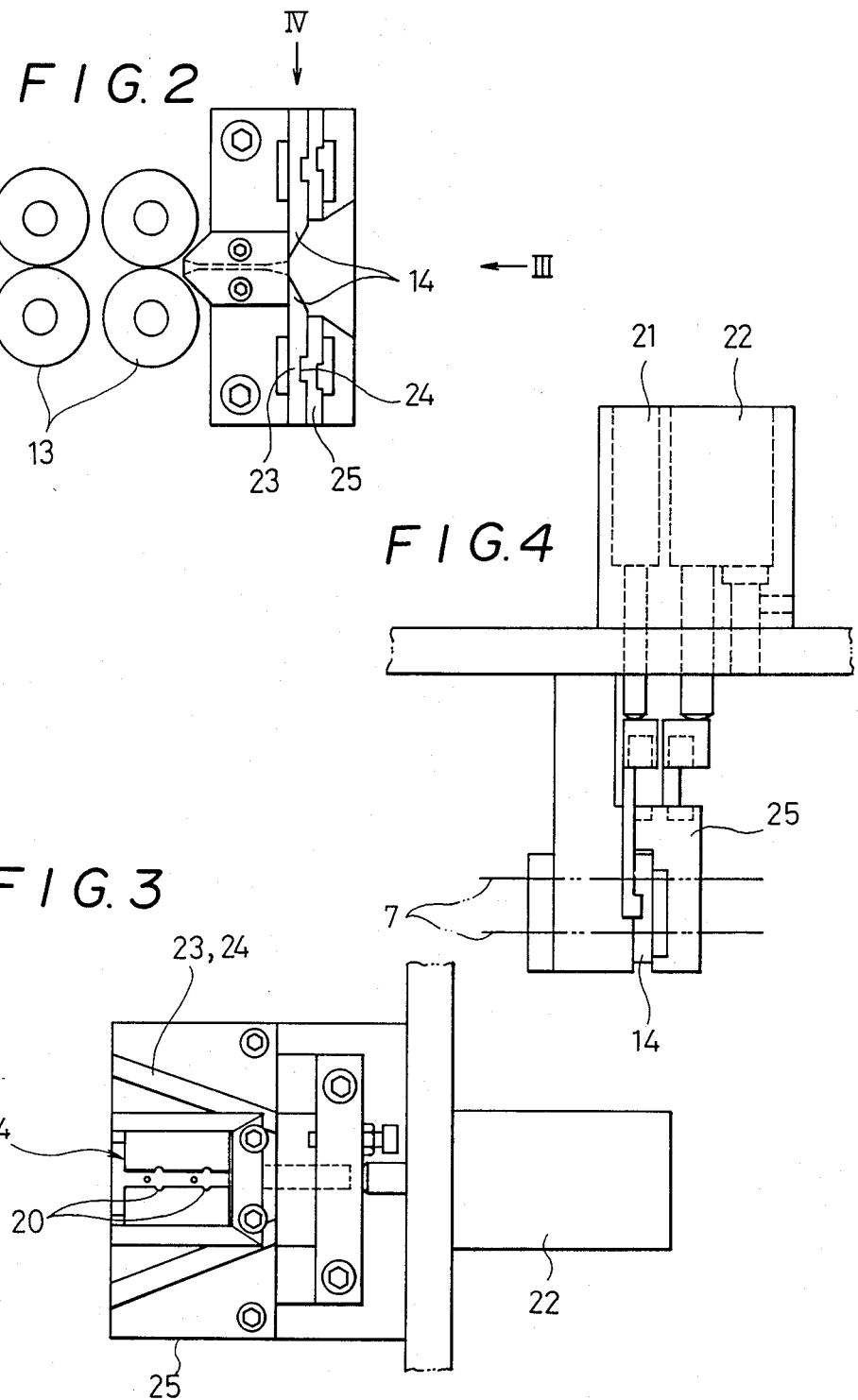

WIRE STRIPPING APPARATUS AND AN AUTOMATIC WIRING DEVICE WHICH INCORPORATES IT

This application is a continuation of application Ser. No. 25,750, filed Mar. 13, 1987, now U.S. Pat. No. 4,738,019.

FIELD OF THE INVENTION

This invention concerns a wire stripping apparatus and an automatic wiring device which incorporates it.

BACKGROUND OF THE INVENTION

The wires used in wiring printed circuit boards and other electrical circuits consist of lead wires cut to specified lengths with the insulative covering at both ends of the wire peeled off. Several so-called wire stripping devices which automatically supply this type of wire have already been proposed and are in actual use.

However, conventional wire stripping apparatus simply cut the lead wire and peel off its insulative covering, and do not operationally coordinate the wire so obtained into the next process step, such as, for example, soldering.

SUMMARY OF THE INVENTION

This invention, having noted the prior art, proposes a wire stripping apparatus which can be coordinated with the soldering and wiring operations, and an automatic wiring device which can automatically perform wiring operations as a result of operationally linking the wire stripping apparatus to an automatic coiling and soldering device.

BRIEF DESCRIPTION OF THE DRAWINGS

The other numerous features and advantages of this invention will be outlined in the following description which refers to the attached drawings, wherein:

FIG. 2 is a side view showing the construction of the cutter portion of the apparatus;

FIG. 3 is a side view from the direction of the arrow III in FIG. 2;

FIG. 4 is a plan view from the direction of the arrow IV in FIG. 2;

ILLUSTRATED EMBODIMENTS OF THE INVENTION

Figure 1:
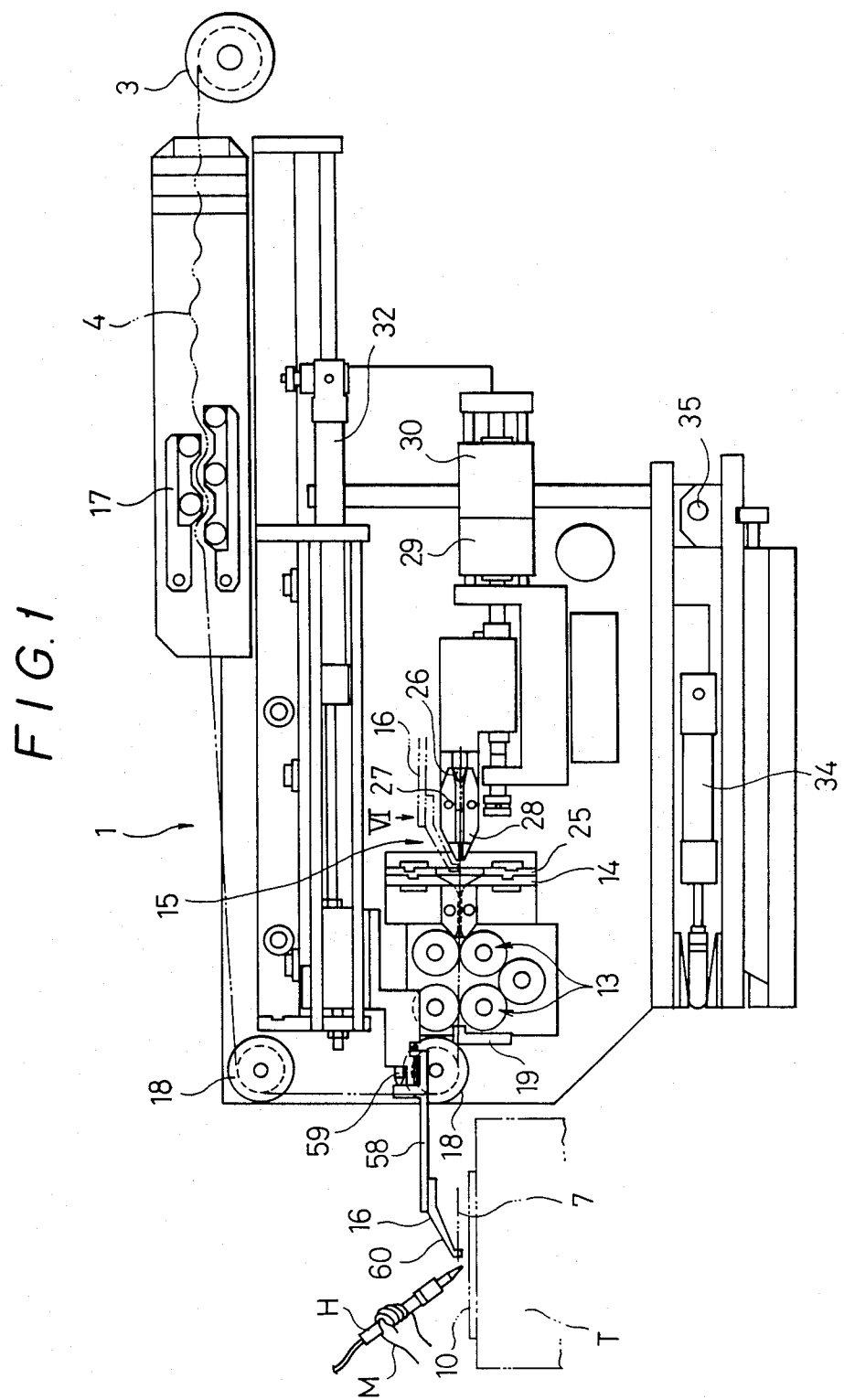
FIG. 1 is an overall side view of the wire stripping apparatus of the present invention.

The following describes one embodiment of this invention with reference being made to the drawings.

FIGS. 1 through 6 illustrate one embodiment of the wire stripping apparatus of the present invention. This wire stripping apparatus 1 is seen to comprise pinch rollers 13, cutters 14, a grip 15, and a supply finger 16. Two lead wires 4 are guided in parallel from the take-up reel 3 into the apparatus, and first pass through the wire drawing unit 17. Within this wire drawing unit 17, the lead wires 4 are compressed from the top and bottom and the slackened lead wires 4 are tensioned. In addition to the wire drawing unit 17 which compresses the wires from the top and bottom thereof, another wire drawing unit may be added so as to compress the wires in the horizontal direction. In addition, if desired or required, only one lead wire 4 may be guided instead of two wires.

The direction of the lead wire 4 which has passed through the wire drawing unit 17 is transposed 180° by means of two feed rollers 18, and guided into the two sets of pinch rollers 13. These pinch rollers 13 can rotate forwardly or backwardly, and feed and feed or rewind the lead wire 4 as required for cutting the lead wires 4 or removing the insulative covering 5 at both ends of the wires. The lead wires 4 are brought between the upper and lower cutters 14 by means of the pinch rollers 13. A curve assisting guide 19, which keeps the lead wire 4 fed by means of the pinch rollers 13 in an accurate position, ensures that the lead wire 4 does not bend after passing through the pinch rollers 13.

The cutting edges of the cutters 14 comprise two opposed pairs of laterally spaced concave cutting parts 20 for removing the insulative covering 5, as seen in FIG. 3. The size of these concave cutting parts 20 corresponds to the thickness of the conductor part 6 of the lead wire 4. The cutters 14 can be moved horizontally and vertically by means of a slide cylinder 21, thus adjusting or indexing the position of a concave cutting part 20 with respect to the lead wire 4. These concave cutting parts 20 are used to remove the insulative wire covering 5, the insulative covering 5 being cut by means of the cutting parts 20 while maintaining the wire conductor portion 6 intact. These cutters 14 are moved together and apart by means of a cutting cylinder 22. More particularly, each cutter 14 has a sloping concave part 23, and each cutter moves vertically in a reciprocating manner as the cutting cylinder 22 moves a frame 25 which includes a convex part 24 that fits into the concave part 23, in a forwards-backwards reciprocating manner, or in other words, in the left to right direction as seen in FIG. 3.

The grip 15 closes the ends of its claws 28 so as to grip the lead wire 4 through means of the insertion of an arrowhead piston 26 between the rear ends of the pair of claws 28 which pivot around fulcrum pins 27. Furthermore, the grip 15 can be moved into three positions (a), (b), (c), as shown in FIGS. 5(A) through 5(H), in the forwards and backwards direction with respect to the cutters 14 through means of the action of two back-to-back cylinders 29 and 30.

The supply finger 16 grips a supply wire 7 through means of the insertion of another piston 59 with the same shape as the piston 26 between a pair of opposed support arms 58 which pivot around a fulcrum, thus opening and closing a pair of fingers 60 provided upon the tips of the supply arms 58, in the same manner as the grip 15 as described above.

The following paragraphs describe the operation of the cutters 14 and the grip 15 which is adjacent to the cutters 14, during cutting of a lead wire 4 and removal of its insulative covering 5, with reference being made to FIGS. 5(A) through 5(H).

(1) A specified length of lead wire 4 is fed by means of the forward rotation of the pinch rollers 13 and its leading end or one end thereof is positioned between the upper and lower cutters 14. At this time, the cutters 14 are laterally adjusted or indexed so that a concave cutting part 20 is aligned with the lead wire 4. At this point, the grip 15 is in position (a) of FIG. 5(A).

Figure 5A:
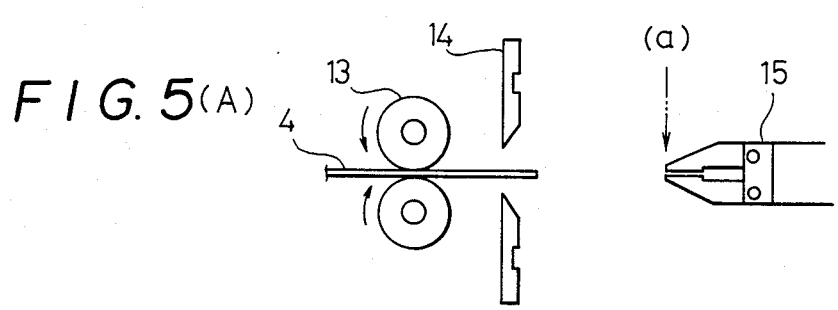
FIGS 5(A) through 5(H) are side views showing the cutting and insulation-peeling of the lead wire.
Figure 5B:
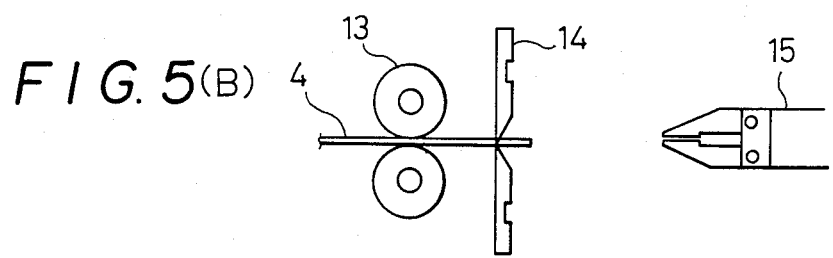

(2) The cutters 14 move up and down toward each other so as to cut only the insulative covering 5 of one end of the lead wire 4 as seen in FIG. 5(B).

Figure 5C:
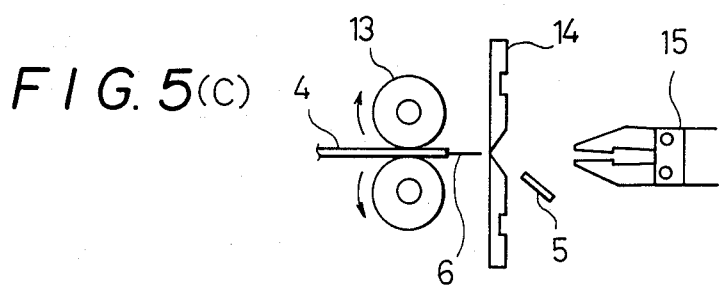

(3) The pinch rollers 13 then rotate in the reverse direction, moving the lead wire 4 slightly to the left as seen in FIG. 5(C), while the cutters 14 are maintained in their cutting position relative to each other, thereby removing the insulative covering 5 which was just cut, and exposing one end of the conductor part 6.

Figure 5D:
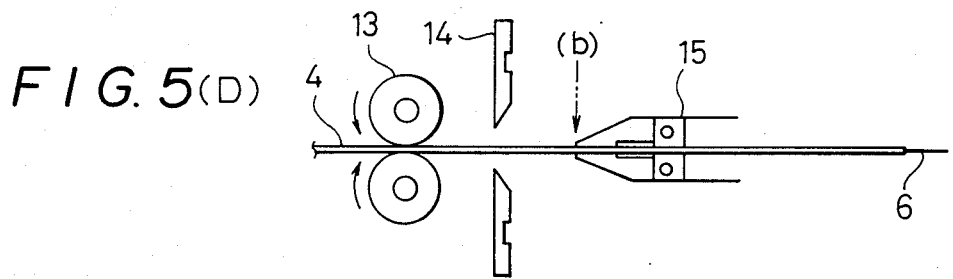

(4) The pinch rollers 13 then rotate forwardly and feed the required amount of lead wire 4. Then the grip 15 slides horizontally—to the left as seen in FIG. 5(D)—and grips and holds the fed lead wire 4 at position (b). At this point in time, the cutters 14 have already been moved horizontally so that a part other than the concave cutting part 20 is now aligned with the lead wire 4. It is always possible to align the cutters 14 and the wire 4 no matter what length of wire has been fed because the direction of the lead wire 4 has been transposed 180° by means of the feed rollers 18 as seen in FIG. 1.

Figure 5E:
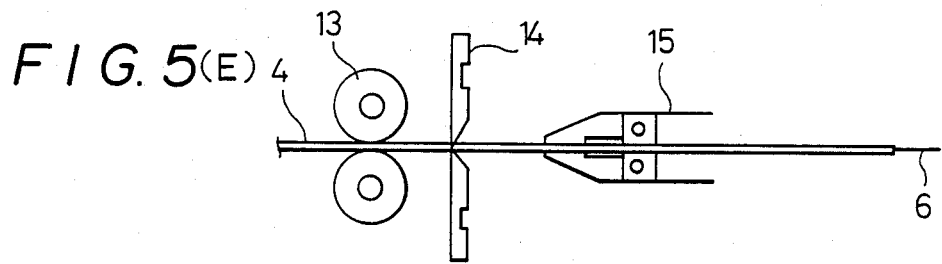

(5) The cutters 14 again move up and down toward each other and cut the lead wire 4 in a middle portion so as to form an end opposite to the leading end. Immediately after such cutting operation, the cutters 14 slide horizontally so as to again align a concave cutting part 20 with the lead wire 4 as seen in FIG. 5(E).

Figure 5F:
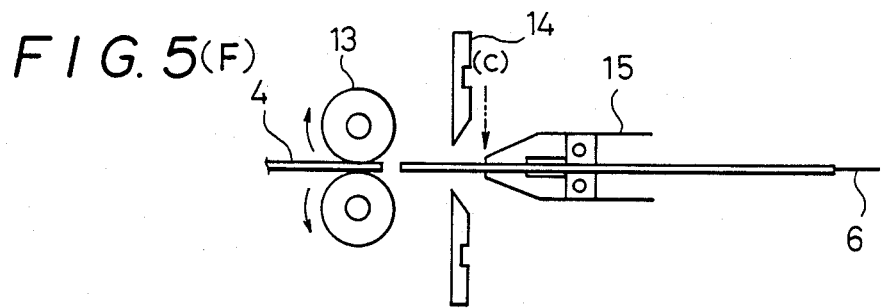

(6) The grip 15 slides slightly horizontally—to the left as seen in FIG. 5(F)—to position (c), and the other end of the cut lead wire 4 is positioned between the cutters 14.

Figure 5G:
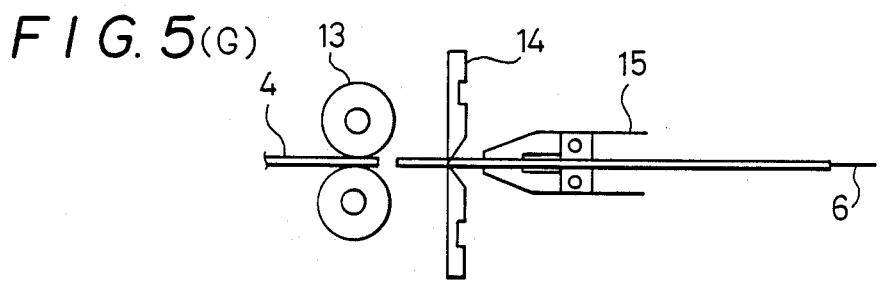

(7) The cutters 14 move up and down toward each other and cut only the insulative covering 5 of the other end of the lead wire 4 as seen in FIG. 5(G).

Figure 5H:
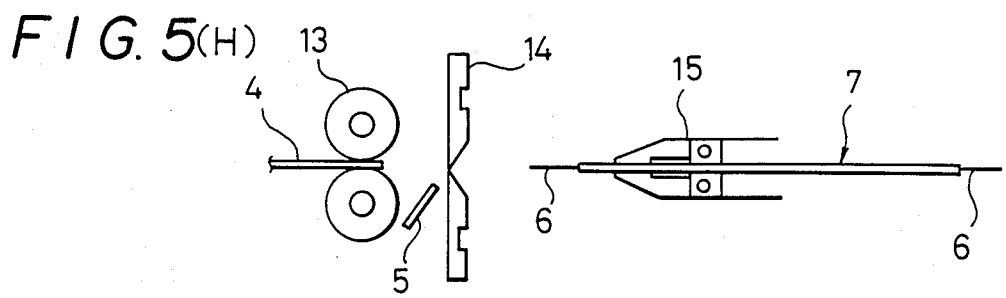
Figure 6:
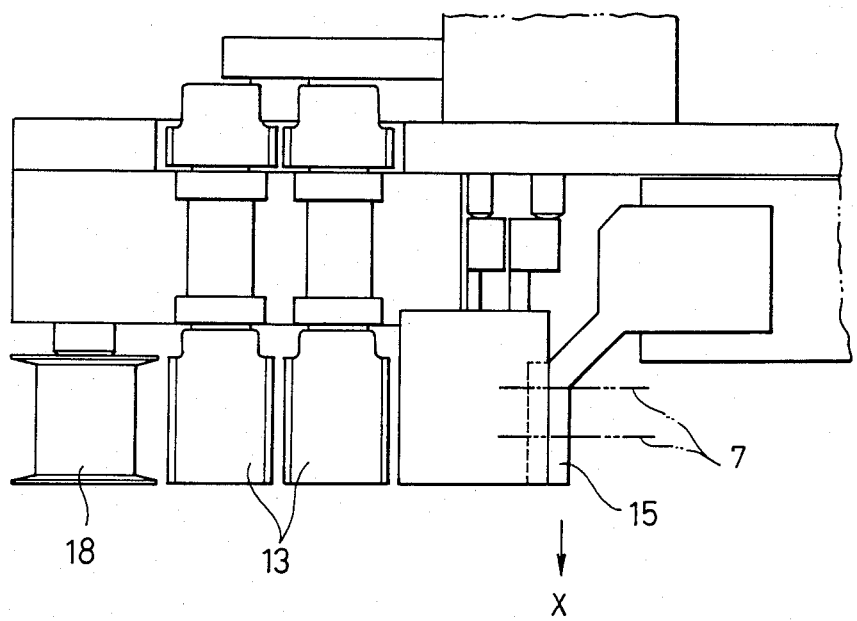
FIG. 6 is a plan view from the direction of the arrow VI in FIG. 1.
Figure 8:
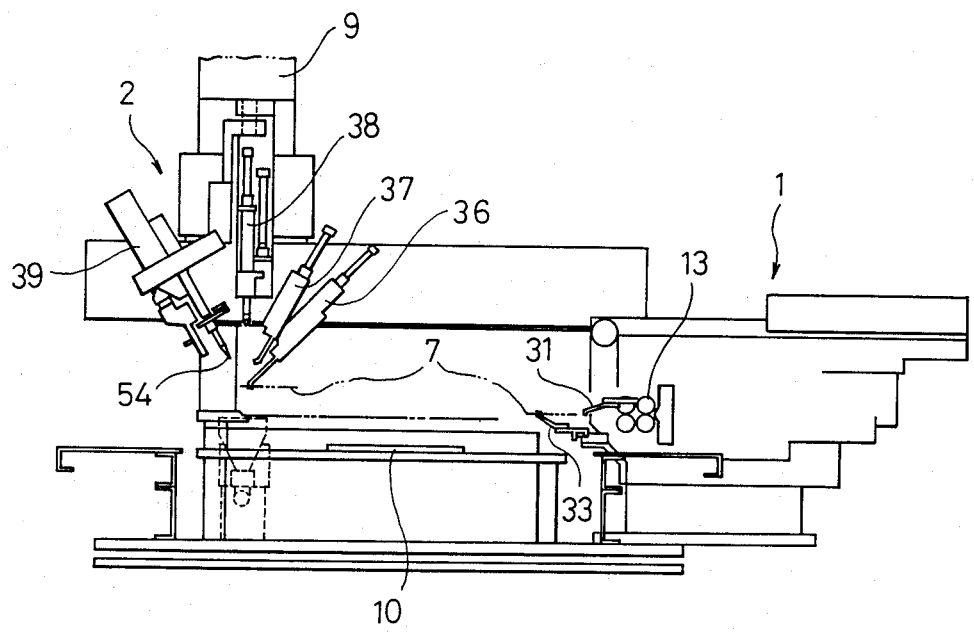
FIG. 8 is a side view of the automatic wiring device shown in FIG. 7.
Figure 7:
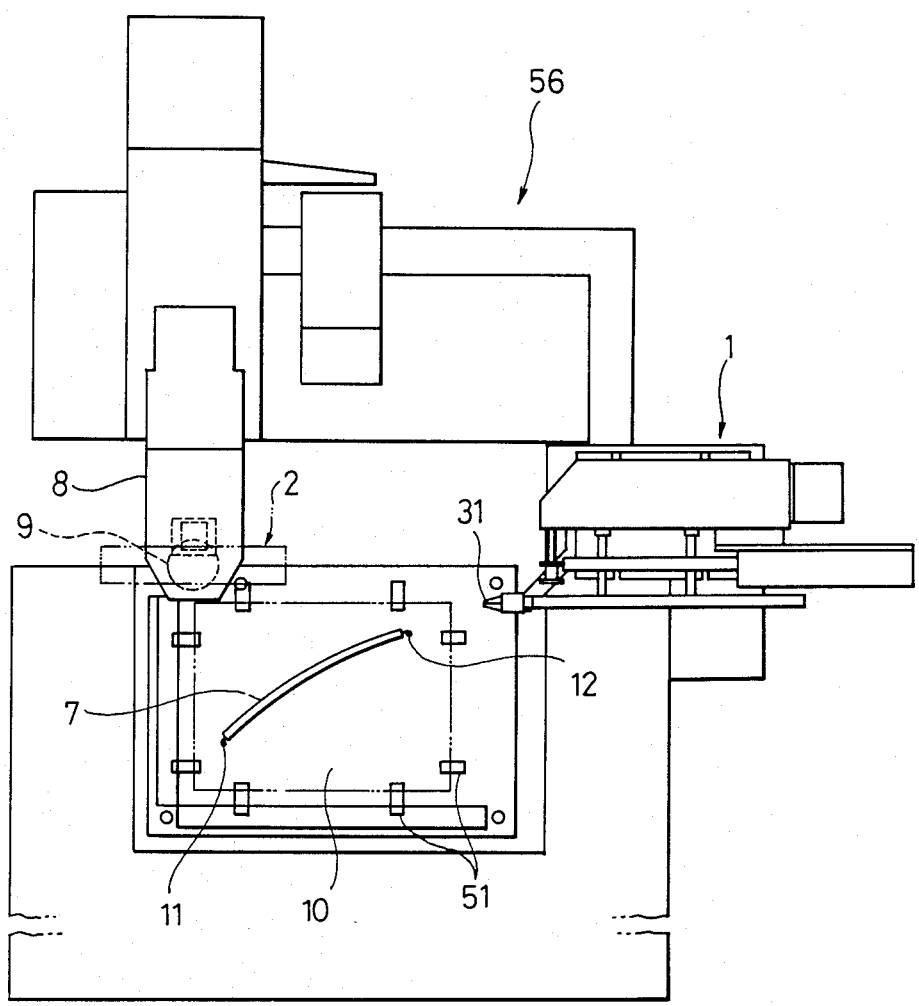
FIG. 7 is a plan view of the automatic wiring device.
Figure 9:
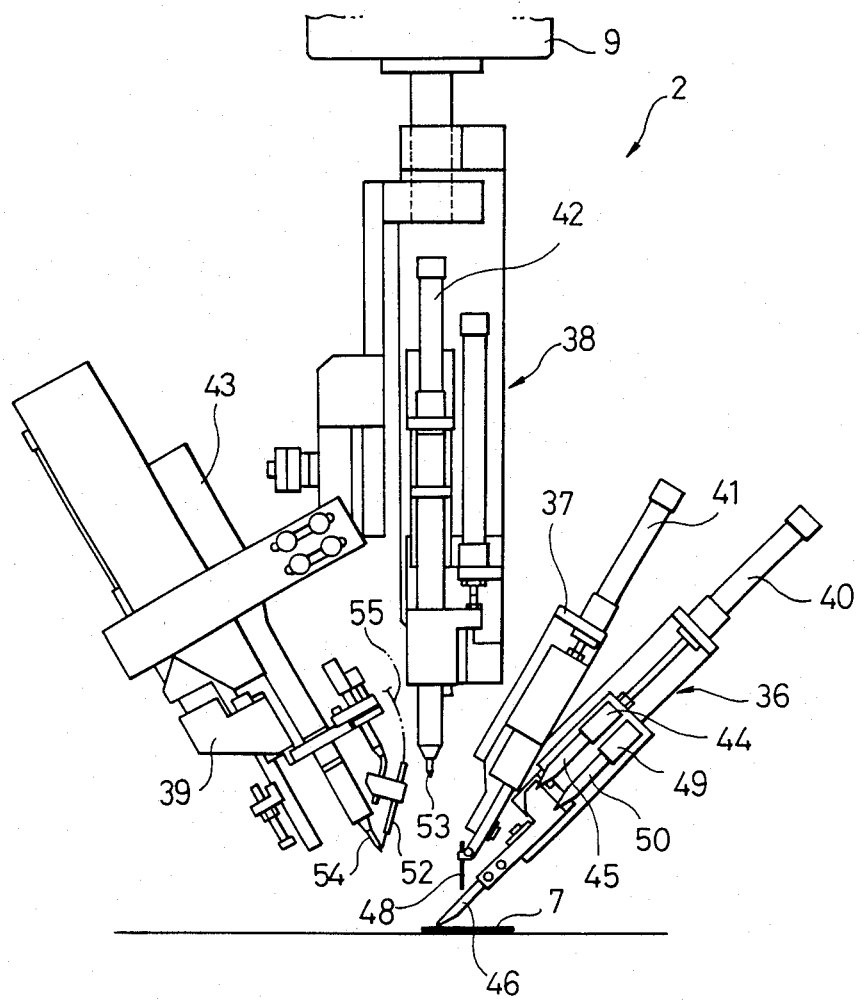
FIG. 9 is an overall side view of the automatic coiling and soldering device.

(8) The grip 15 then draws back to position (a), with the cutters maintained at their cutting position thereby peeling off the insulative covering 5 which was just cut, and exposing the conductor part 6 of the other end of the lead wire. At this point in time, the desired wiring 7 has been obtained as seen in FIG. 5(H).

The foregoing has described the cutting of a lead wire and the removal of its insulative covering 5 by means of the cutters 14 and the grip 15. (When two lead wires 4 are fed simultaneously from the take-up reel 3, the grip 15 slides horizontally in the direction of arrow X in FIG. 6 so as to simultaneously hold the two wires 7 thus derived.) Continuing further in the wiring process, the supply finger 16 then slides backwardly through means of the action of the cylinder 32 and takes hold of the wires 7 which are held by the horizontally sliding grip 15, and then returns to the forward position as shown by the solid lines in FIG. 1. At this point in time, each wire 7 is accurately positioned upon the printed circuit board 10 which is mounted on top of a work table T which is joined to the wire stripping apparatus 1, and because the worker M is not required to position the wire upon the printed circuit board 10, no mistakes are made in positioning the wire for the soldering operation and manual soldering work can be carried out continuously using a soldering iron H. Furthermore, as described hereinabove, it is also possible to fix the wire 7, positioned by means of the supply finger 16, using an automatic device instead of manually fixing the wire 7 upon the circuit board 10. At the bottom of the device there is a cylinder 34, and by extending or contracting the cylinder 34, the entire device can be made to pivot around a rotational hinge 35, thus adjusting the vertical position of the tips of the supply finger 16.

As described hereinabove, the wire stripping apparatus 1 is provide with horizontally moving cutters 14 with concave cutting parts 20 defined within the cutting edges thereof. By moving these cutters 14 horizontally, the concave cutting parts 20 are aligned with the lead wire 4 and only the insulative covering 5 of the lead wire 4 can be cut, or alternatively, the lead wire 4 itself can be cut by aligning it with a part other than the concave cutting part 20. Therefore, the cutters 14 can move in timed relation with the grip 15 which holds the lead wire 4 and moves backwardly and forwardly with respect to the cutters 14, thus cutting the lead wire 4 into specified lengths. Then, by removing the insulative covering 5 from both ends of the lead wire 4, the desired jumper wire 7 can be obtained from a continuous lead wire 4. In addition, the supply finger 16 can be moved toward the grip 15 so as to grasp the wire 7 obtained in accordance with the foregoing operations, and transport the same to, and position it so as to facilitate, the next process step.

Next, one embodiment of the automatic wiring device will be described with reference to FIGS. 7 through 13. This automatic wiring device 56 consists of a wire stripping apparatus 1 and an automatic coiling and soldering device 2. The wire stripping apparatus 1 has substantially the same construction as that of the embodiment just described, but in this embodiment, the supply finger 16 of the wire stripping apparatus 1 comprises an upper finger 31 which is moved forwardly and backwardly by means of cylinder 32 and a lower finger 33. the jumper wire 7 to be "wired", which has been positioned and held by means of the upper finger 31, is passed to the lower finger 33. During this operation, the entire device is inclined forwardly about the hinge 35 through means of the movement of the cylinder 34 provided upon the lower part of the device, so as to pass the wire from the upper finger 31 to the lower finger 33. At this point in time, the aforementioned automatic coiling and soldering device 2 switches into its ready status. The construction of the upper and lower fingers 31 and 33 is substantially identical to that of the supply finger 16 just described, so consequently, their description has been omitted herefrom.

Furthermore, the automatic coiling and soldering device 2 mounted upon the head 9 of a freely movable and rotatable robot arm 8, can be used to coil the exposed conductor parts 6 at both ends of the jumper wire 7 around the pins 11 and 12 at the two places upon the printer circuit board 10 at which the wire ends are to be soldered, and can then solder the wires at such locations. For wiring design reasons, or to make improvements to an existing printed circuit board, the circuit printed upon the printed circuit board may indicate or dictate the connection to be made by means of the lead wire to two mutually separated predetermined pins located upon the printed circuit board. This connection is usually called "jumper wiring" and it can be performed automatically by means of the automatic coiling and soldering device 2.

The entire automatic coiling and soldering device 2 is mounted upon the head 9 of a freely movable and freely rotatable robot arm 8, and comprises a setting finger 36, a sensor finger 37, a wrapping mechanism 38, and a soldering mechanism 39. Each of these components move upwardly and downwardly independently of each other by means of individually provided cylinders 40, 41, 42, 43, which radiate outwardly from the wrapping mechanism 38 which is mounted within the center of the device 2.

In operation, the entire automatic coiling and soldering device 2 moves towards the wire stripping apparatus 1 through means of the movement of the robor arm 8, and one end of the jumper wire 7, which was held by means of the lower finger 33, is transferred to the grip of the setting finger 36 as if the upper finger 31 was holding it.

Figure 11:
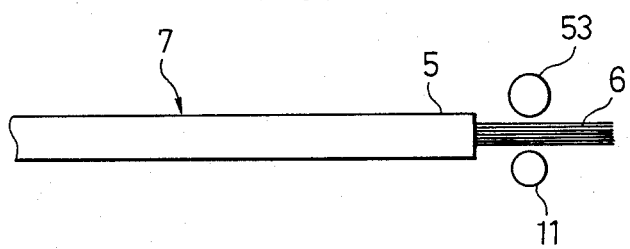
FIG. 11 is an enlarged plan view of the lead wire showing the conductor part of the lead wire before it is coiled around the pin.
Figure 12:
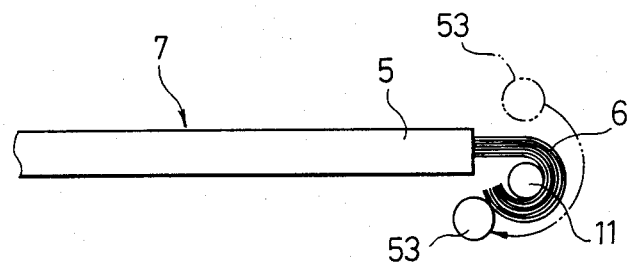
FIG. 12 is an enlarged plan view corresponding to FIG. 11 but with the wire coiled about the pin.
Figure 13:
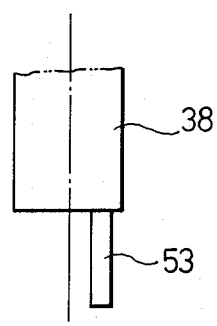
FIG. 13 shows an enlarged side view of the wrapping pin.

With the setting finger 36 holding one end of the jumper wire 7, the entire automatic coiling and soldering device 2 is moved by means of the robot arm 8 toward the printed circuit board 10 which is fixed by means of the positioning tool 51, and the conductor part 6 of the jumper wire 7 is positioned immediately adjacent to one of the pins 11 so as to be soldered thereto. Next, the wrapping mechanism 38 is moved downwardly and the conductor part 6 of the muper wire 7 is caught between the wrapping pin 53 located on a peripheral edge portion of the wrapping mechanism 38 and the pin 11 disposed on top of the printed circuit board 10 as seen in FIG. 11. The wrapping pin 53 is mounted at a position disposed off-center from the front edge of the wrapping mechanism 38 as seen in FIG. 13. Thus, the conductor part 6 is coiled around pin 11 by means of the rotation of the wrapping pin 53 in the specified direction, that is, the rotation of the pin 53 around the circumference of pin 11 in the clockwise direction, as seen in FIGS. 11 and 12.

Once the conductor part 6 has been coiled around the pin 11, the soldering mechanism 39 descends and the soldering iron tip 54 is pushed upwardly so as to contact pin 11 around which the conductor part 6 is to be coiled. Thread solder 55 is automatically supplied from a supply nozzle 52 to the soldering iron tip 54 and soldering is therefore performed automatically. This completes the soldering of one end of the jumper wire 7.

Figure 10:
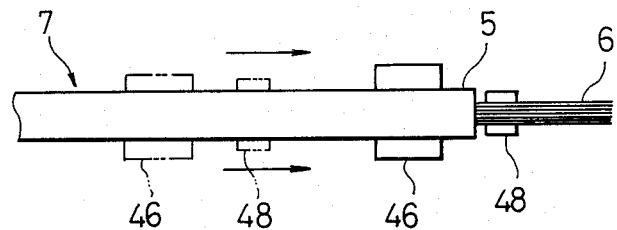
FIG. 10 is an enlarged view of the lead wire showing the conductor part of the lead wire as detected by means of the sensor finger.

Subsequently, the head 9 rotates 180° so as to face or be disposed in the reverse direction, and the setting finger 36 descends together with the sensor finger 37 and lightly grips the jumper wire 7, one end of which has already been soldered, at the opposite end from which it was previously held. This light grip is obtained by means of the shallow insertion of the arrowhead piston 45 of the cylinder 44 between the read ends of the claws 46. At this point in time, the sensor finger 37 descends and lightly grips the wire 7 together with the setting finger 36 but at a location slightly toward the front of the wire. Then, both the sensor finger 37 and the setting finger 36 slide quickly together, while still holding the jumper wire 7, toward a position which is located forwardly of the opposite end of the jumper wire 7. When the sensor finger 37 and the setting finger 36 approach a position which is close to the conductor part 6 of the other end of the wire 7, the sliding movement is decreased, and when the sensor finger 37 reaches part of the conductor part 6, as seen in FIG. 10, the claw 48 of the sensor finger 37 passes over the conductor part 6 of the other end of the jumper wire 7, thus detecting its position. Once its position is detected, a signal is transmitted to a control part, not shown in the drawings, and the arrowhead piston 50 of another cylinder 49 associated with the setting finger 36 is inserted, this time with considerable force, deep between the ends of the claws 46. Consequently, the ends of the claws 46 close, holding the other end of the jumper wire 7 tightly at a fixed position. Once the setting finger 36 has a tight hold upon the jumper wire 7, the role of the sensor finger 37 is complete and it is moved away.

Subsequently, the conductor part 6 of jumper wire 7 is positioned immediately adjacent to pin 12 which has not yet been soldered, and is then coiled about and soldered thereto as outlined above. This completes the wiring of the jumper wire 7.

In the above description, the position of the conductor part 6 was detected using the sensor finger 37, however, an optical sensor can also be used, or the slide distance of the setting finger 36 can be matched in advance with the length of the jumper wire 7 whereby the device can be predeterminedly arranged so as to slide only such fixed distance in order to grip the other end of the jumper wire 7.

As described above, in the automatic wiring device 56, the entire automatic coiling and soldering device 2 is moved toward the wire stripping apparatus 1 by means of the robot arm 8, and the setting finger 36 of the automatic coiling and soldering device 2 moves with respect to the wire 7 which has been positioned using the supply finger 16 of the wire stripping apparatus 1, Once the setting finger 36 has gripped one end of the jumper wire 7, the entire automatic coiling and soldering device 2 is moved upon its robot arm 8, and the conductor part 6 at one end of the jumper wire 7 is positioned by means of the setting finger 36 relative to the pin 11 so as to be soldered thereto upon the printed circuit board 10. The conductor part 6 which has been positioned adjacent to the pin 11 is coiled around the pin through means of the circular rotation of the wrapping pin 53 of the wrapping mechanism 38. Once the coiling of the conductor part 6 is completed, that part is soldered by means of the soldering mechanism 39. Then the jumper wire 7 is transferred to the grip of the setting finger 36, which while still holding wire 7, slides quickly therealong so as to detect the conductor part 6 at the other end and grip it at a specified location of the other end. In other words, the setting finger 36 lightly grips the jumper wire 7 and while holding it, is slid quickly toward the vicinity of the other end, its slide being slowed or decreased in speed once its approaches the other end. When it detects the conductor part 6 of the jumper wire 7, the setting finger 36 tightly grips the jumper wire 7. Therefore, the setting finger 36 can detect the position of the other end of the jumper wire 7 and can always grip it at a specified location. Then the conductor part 6 of the other end is positioned adjacent to the other pin 12 to which the wire 7 is to be soldered, and is coiled and soldered in the same manner. In this way, the two pins 11 and 12 are connected together by soldering jumper wire 7, thereby completing the wiring operation.

Therefore, since the wire stripping apparatus of the present invention can automatically supply the wire necessary for the wiring operation by means of cutting a continuous lead wire and removing its insulative covering, and wherein the apparatus can also convey the wire thus obtained to a fixed position, and position it at such location, a worker can continuously work without having to position the wire.

Furthermore, since the automatic wiring device can solder a wire obtained from the wire stripping apparatus to any two pins upon the printed circuit board, the wiring operation, such as, for example, the jumper wire wiring process, which could previously be performed only manually, can now be performed automatically, accurately, and quickly.

Obviously, many modifications and variations of the present invention are possible in light of the above teachings. It is therefore to be understood that within the scope of the appended claims, the present invention may be practiced otherwise than as specifically described herein.

I claim:

1. Apparatus for cutting a lead wire having a predetermined length from a supply wire having an extended length, and for removing portions of insulation covering from opposite ends of said cut lead wire of said predetermined length, comprising:
   a supply reel upon which said supply wire of said extended length is disposed and from which said supply wire is withdrawn in a wire feeding direction;
   cutter means, having a first supply wire cutting section and a second insulation covering cutting section, mounted so as to be indexably movable within a plane substantially transverse with respect to said wire feeding direction between two predetermined positions for selectively aligning said first and second cutting sections with said supply and lead wires, respectively, and mounted so as to be reciprocably movable within a plane substantially perpendicular to said supply and lead wires so as to cut said supply wire at a predetermined portion thereof in order to form said lead wire, and to remove said insulation covering portions from said opposite ends of said lead wire;
   first reversibly-driven means for feeding said supply wire in a first direction from said supply reel, and for moving said supply wire in a second direction back toward said supply reel, relative to said cutter means so as to operatively cooperate with said cutter means in order to facilitate the formation of said lead wire of said predetermined length and the removal of a first insulation covering portion from a first end portion of said lead wire; and
   second reversibly-driven means for gripping said cut lead wire and for moving said cut lead wire in opposite directions relative to said cutter means so as to operatively cooperate with said cutter means in order to facilitate removal of a second insulation covering portion from a second end portion of said lead wire.

2. Apparatus as set forth in claim 1, further comprising:
   wire drawing means, interposed between said supply reel and said first reversibly-driven means, for compressing said supply wire fed from said supply reel in order to straighten and tension any slackened portions of said supply wire.

3. Apparatus as set forth in claim 1, wherein said gripping means comprises:
   a pair of claws pivotable about a central fulcrum; and
   arrowhead piston means insertable between rear end portions of said claws for causing front end portions of said claws to close and thereby grip said lead wire.

4. Apparatus as set forth in claim 1, further comprising:
   means for transporting said lead wire from said gripping means to a subsequent processing station after said insulation portions have been removed from both ends of said lead wire.

5. Apparatus as set forth in claim 4, wherein said transporting means comprises:
   a pair of supply fingers pivotable about a central fulcrum; and
   arrowhead piston means insertable between rear end portions of said supply fingers for causing front end portions of said supply fingers to close and thereby grip said lead wire.

6. Apparatus as set forth in claim 1, further comprising automatic coiling and soldering means for connecting said lead wire, serving as a jumper wire, to two pins of a printed circuit board, comprising:
   setting finger means for gripping each end of said jumper wire and for respectively positioning both ends of said jumper wire within the vicinity of said two pins of said printed circuit board to which said jumper wire ends are to be soldered, respectively;
   a wrapping mechanism which has at its end a wrapping pin means for coiling a conductor part of each end of said jumper wire around each of said pins of said printed circuit board; and
   a soldering mechanism for soldering each of said coiled conductor parts of said jumper wire to each of said pins of said printed circuit board.

7. Apparatus as set forth in claim 6, wherein:
   said wrapping pin means is mounted off-center upon the front of said wrapping mechanism and rotates in a circular orbit about the axis of said wrapping mechanism while pressing said conductor part of each end of said jumper wire against and around each of said pins of said printed circuit board to which said jumper wire is to be soldered.

8. Apparatus as set forth in claim 6, wherein:
   said setting finger means, said wrapping mechanism, said soldering mechanism, and a sensor finger are mounted independently upon individual cylinders for free vertical up and down movement in radial directions about a substantially central point defined by said printed circuit board.

9. Apparatus as set forth in claim 6, further comprising:
   means to lightly grip said jumper wire of which one conductor end has already been coiled around a first pin of said printed circuit board, wherein said sensor finger means lightly grips a part of said jumper wire which is disposed slightly towards the other end of said jumper wire with respect to the part lightly gripped by said setting finger means;
   means for causing said setting finger means and said sensing finger means to move quickly towards said other end of said jumper wire;
   means for detecting said conductor part at the other end of said jumper wire so as to reduce the speed of, and stop, said movement of said sensing finger means and said setting finger means;
   means for transmitting a signal to said setting finger means in response to said detected other end of said conductor for causing said setting finger means to strongly grip said other end of said jumper wire in preparation for wrapping and soldering said other end of said jumper wire, by said wrapping mechanism and said soldering mechanism, to a second pin of said printed circuit board; and means for moving said sensing finger means away from said jumper wire.

10. Apparatus as set forth in claim 1, wherein:

said first reversibly-driven means comprises a pair of opposed pinch rollers.

11. Apparatus as set forth in claim 1, wherein:

said cutter means comprises a pair of opposed cutters each of which is movable vertically up and down toward and away from each other so as to permit insertion of said supply and lead wires therebetween when said pair of cutters are moved away from each other to an open position, and to permit cutting of said supply wire and said insulation covering of said lead wire when said cutters are moved toward each other to a closed position.

12. Apparatus as set forth in claim 11, wherein:

said second cutting sections of each of said cutters comprises concave portions the diameter of which is less than the outside diameter of said supply wire yet greater than that of the conductor portion of said supply wire so as to sever said insulation covering portion of said supply wire.

13. Apparatus for cutting a lead wire having a predetermined length from a supply wire having an extended length, and for removing portions of insulating covering from opposite ends of said cut lead wire of said predetermined length, comprising:

a supply reel upon which said supply wire of said extended length is disposed and from which said supply wire is withdrawn in a wire feeding direction;

cutter means having a first supply wire cutting section and a second insulation covering cutting section;

means for reciprocably moving said cutter means within a plane disposed substantially perpendicular to said wire feeding direction between a cutting position and a non-cutting position;

means for indexably moving said cutter means within a plane disposed substantially transverse to said wire feeding direction so as to selectively align said first supply wire cutting section and said second insulation covering cutting section with said supply and lead wires for the performance of supply wire cutting and insulation covering removal operations, respectively;

first drive means for moving said supply wire relative to said cutter means;

means for actuating said indexably moving means for aligning said insulation covering cutting section of said cutter means with said supply wire and for disposing said supply wire cutting section of said cutter means in a non-aligned position;

means for actuating said first drive means so as to advance a predetermined amount of said supply wire relative to said cutting means such that a first portion of said insulation covering of said supply wire can be removed from a first end of said supply wire;

means for actuating said reciprocably moving means so as to move said cutter means to said cutting position for severing said first portion of said insulation covering of said supply wire;

means for actuating said first drive means in a reverse direction while said cutter means is maintained at said cutting position for removing said first portion of said insulating covering of said supply wire from said first end of said supply wire;

means for actuating said reciprocably moving means so as to move said cutter means to said non-cutting position;

means for actuating said indexably moving means for aligning said first supply wire cutting section of said cutter means with said supply wire and for disposing said insulation covering cutting section of said cutter means at a non-aligned position;

means for actuating said first drive means so as to advance a predetermined amount of said supply wire relative to said cutter means such that a predetermined length of said lead wire is defined from said supply wire with a second end of said lead wire being disposed within the vicinity of said cutter means;

means for actuating said reciprocably moving means so as to move said cutter means to said cutting position such that said first supply wire cutting section severs said supply wire so as to define said lead wire;

means for actuating said reciprocably moving means so as to move said cutter means to said non-cutting position;

second drive means for moving said lead wire relative to said cutter means;

means for actuating said indexably moving means for aligning said insulating covering cutting section of said cutter means with said lead wire and for disposing said supply wire cutting section of said cutter means in a non-aligned position;

means for actuating said second drive means in said reverse direction so as to dispose a predetermined amount of said lead wire at a predetermined position relative to said cutter means so as to define a second end portion of said lead wire from which a second insulation portion of said insulation covering of said lead wire can be removed;

means for actuating said reciprocably moving means so as to move said cutter means to said cutting position for severing said second insulation covering portion of said lead wire; and means for actuating said second drive means in said advance direction while said cutter means is maintained at said cutting position for removing said second insulation covering portion of said lead wire from said second end of said lead wire.

14. Apparatus as set forth in claim 13, wherein:

said cutter means comprises a pair of opposed cutters each of which is movable vertically up and down toward and away from each other so as to permit insertion of said supply and lead wires therebetween when said pair of cutters are moved away from each other to said non-cutting position, and to permit cutting of said supply wire and said insulation covering of said lead wire when said cutters are moved toward each other to said cutting position.

15. Apparatus as set forth in claim 14, wherein:

said second cutting sections of each of said cutters comprises concave portions the diameter of which is less than the outside diameter of said supply wire yet greater than that of the conductor portion of said supply wire so as to sever said insulation covering portion of said supply wire.

16. Apparatus as set forth in claim 13, wherein:
said first drive means comprises a pair of opposed pinch rollers.

17. Apparatus as set forth in claim 13, wherein:
said second drive means comprises gripping means, for gripping said lead wire, which include a pair of claws pivotable about a central fulcrum, and arrowhead piston means insertable between rear end portions of said claws for causing front end portions of said claws to close and thereby grip said lead wire.

18. Apparatus as set forth in claim 13, further comprising automatic coiling and soldering means for connecting said lead wire, serving as a jumper wire, to two pins of a printed circuit board, comprising:
setting finger means for gripping each end of said jumper wire and for respectively positioning both ends of said jumper wire within the vicinity of said two pins of said printed circuit board to which said jumper wire ends are to be soldered, respectively;
a wrapping mechanism which has at its end a wrapping pin means for coiling a conductor part of each end of said jumper wire around each one of said pins of said printed circuit board; and
a soldering mechanism for soldering each of said coiled conductor parts of said jumper wire to each of said pins of said printed circuit board.

19. Apparatus as set forth in claim 18, wherein:
said wrapping pin means is mounted off-center upon the front of said wrapping mechanism and rotates in a circular orbit about the axis of said wrapping mechanism while pressing said conductor part of each end of said jumper wire against and around each of said pins of said printed circuit board to which said jumper wire is to be soldered.

20. Apparatus as set forth in claim 18, wherein:
said setting finger means, said wrapping mechanism, said soldering mechanism, and a sensor finger are mounted independently upon individual cylinders for free vertical up and down movement in radial directions about a substantially central point defined by said printed circuit board.

* * * * *